May 16, 1933.    T. W. ADAIR    1,908,675

PIPE HOLDER

Filed Dec. 4, 1928    4 Sheets-Sheet 1

Inventor
Thomas W. Adair
By
Hardway Tatley
Attorneys

May 16, 1933.　　　T. W. ADAIR　　　1,908,675

PIPE HOLDER

Filed Dec. 4, 1928　　　4 Sheets-Sheet 3

Inventor
Thomas W. Adair

By Hardway Cathey
Attorneys

May 16, 1933.  T. W. ADAIR  1,908,675
PIPE HOLDER
Filed Dec. 4, 1928  4 Sheets-Sheet 4

Patented May 16, 1933

1,908,675

UNITED STATES PATENT OFFICE

THOMAS W. ADAIR, OF HOUSTON, TEXAS, ASSIGNOR TO HOWARD SMITH COMPANY, A CORPORATION OF TEXAS

PIPE HOLDER

Application filed December 4, 1928. Serial No. 323,733.

This invention relates to new and useful improvements in a pipe holder.

One object of the invention is to provide a holder of the character described designed to be mounted in a rotary table, or other support, and provided to support pipe or tubing suspended in a well bore and which is of such novel formation that it will securely hold the pipe while the pipe is suspended therefrom, but which will readily release the pipe when the pipe is elevated relative to the holder.

Another object of the invention is to provide a pipe holder of the character described which will readily grip and hold the pipe suspended therefrom without injury to the suspended pipe, and which, at the same time, will readily release the pipe when the pipe is moved upwardly relative thereto and thus will not stick or wedge between the held pipe and the downwardly converging seat, in which the holder is located, so tightly as to make it difficult to release the pipe when it is desired to elevate the pipe in breaking up the string.

Another object of the invention is to provide means for readily releasing the slip, forming a part of the holder, from the adapter seat, in case the slip becomes wedged, or stuck, therein.

A further feature of the invention resides in the provision of means by which the slip sections may be maintained in proper horizontal alignment in seating said sections in the adapter around the pipe to be held. The holder herein described is adapted for use in holding pipe and tubing suspended in a well bore but may also be employed for holding rods, and the like as well.

With the above and other objects in view this invention has particular relation to certain novel features of construction, operation and arrangement of parts an example of which is given in this specification and illustrated in the accompanying drawings wherein.

Figure 1:
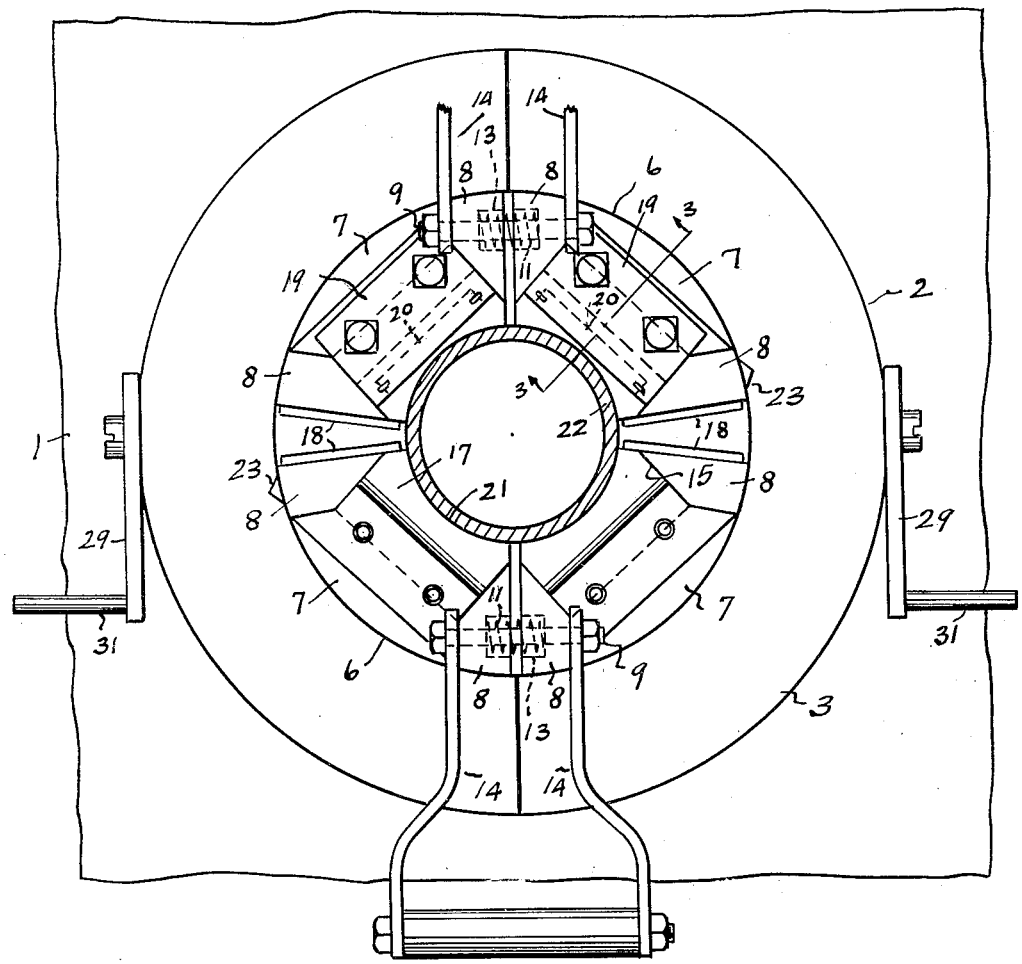
Figure 1 shows a plan view of one type of the holder, with certain parts removed for the sake of clearness.
Figure 2:
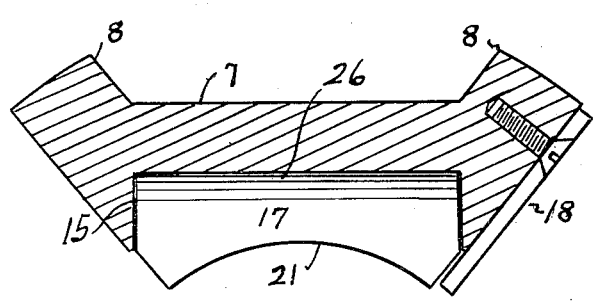
Figure 2 shows a cross sectional view of one of the slip segments thereof.
Figure 3:
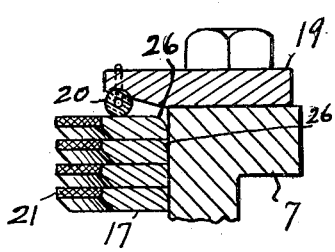
Figure 3 shows a fragmentary cross sectional view thereof, taken on the line 3—3 of Figure 1.
Figure 4:
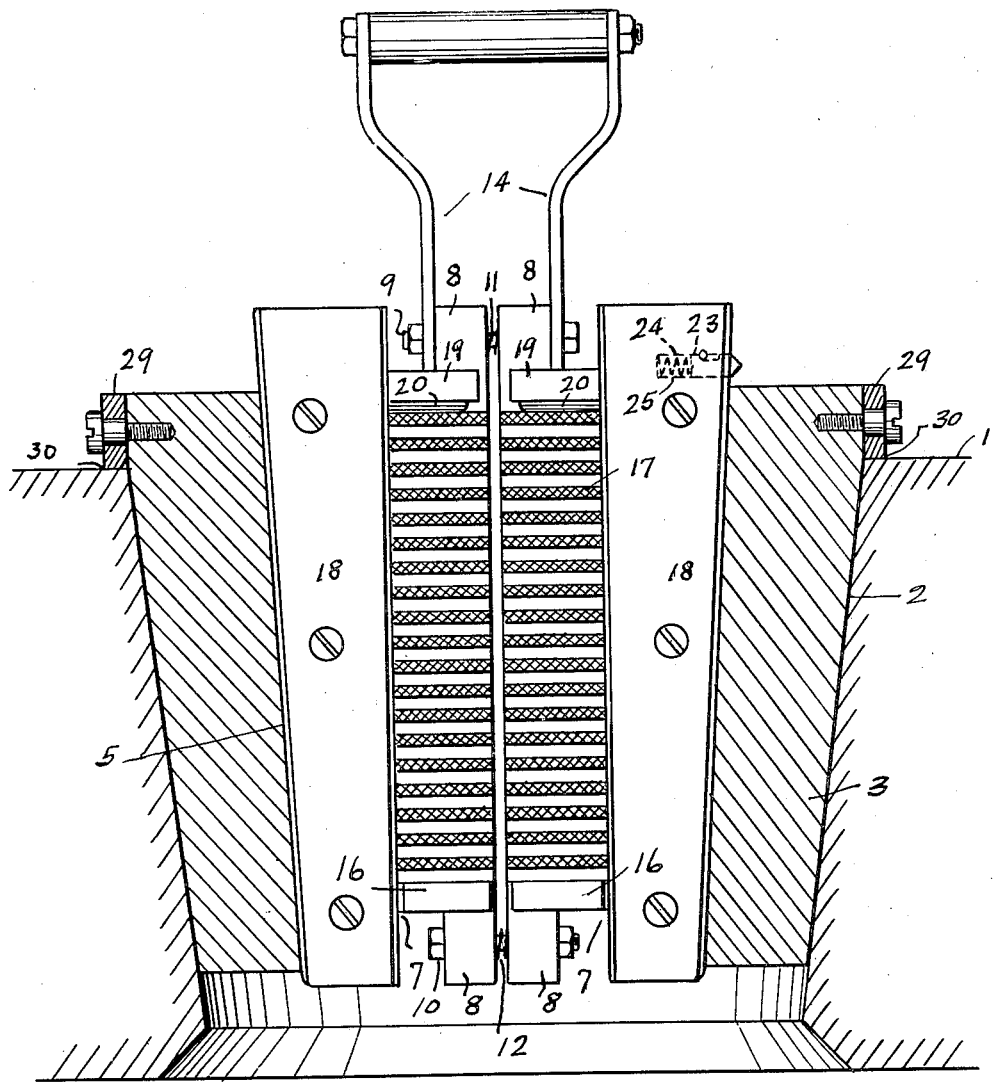
Figure 4 shows a vertical sectional view thereof.
Figure 5:
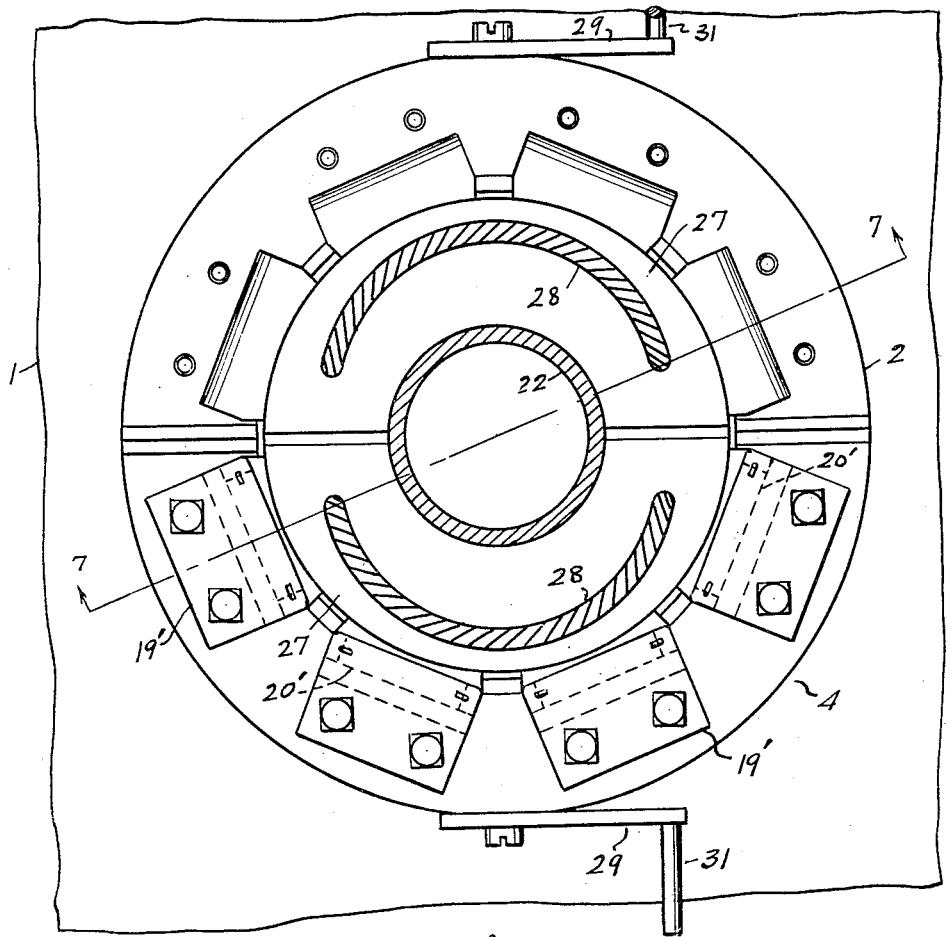
Figure 5 shows a plan view of another type of the holder showing certain parts removed.
Figure 6:
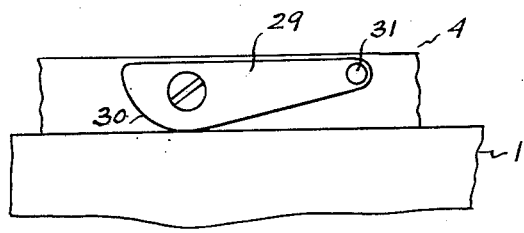
Figure 6 shows a fragmentary side view thereof.
Figure 7:
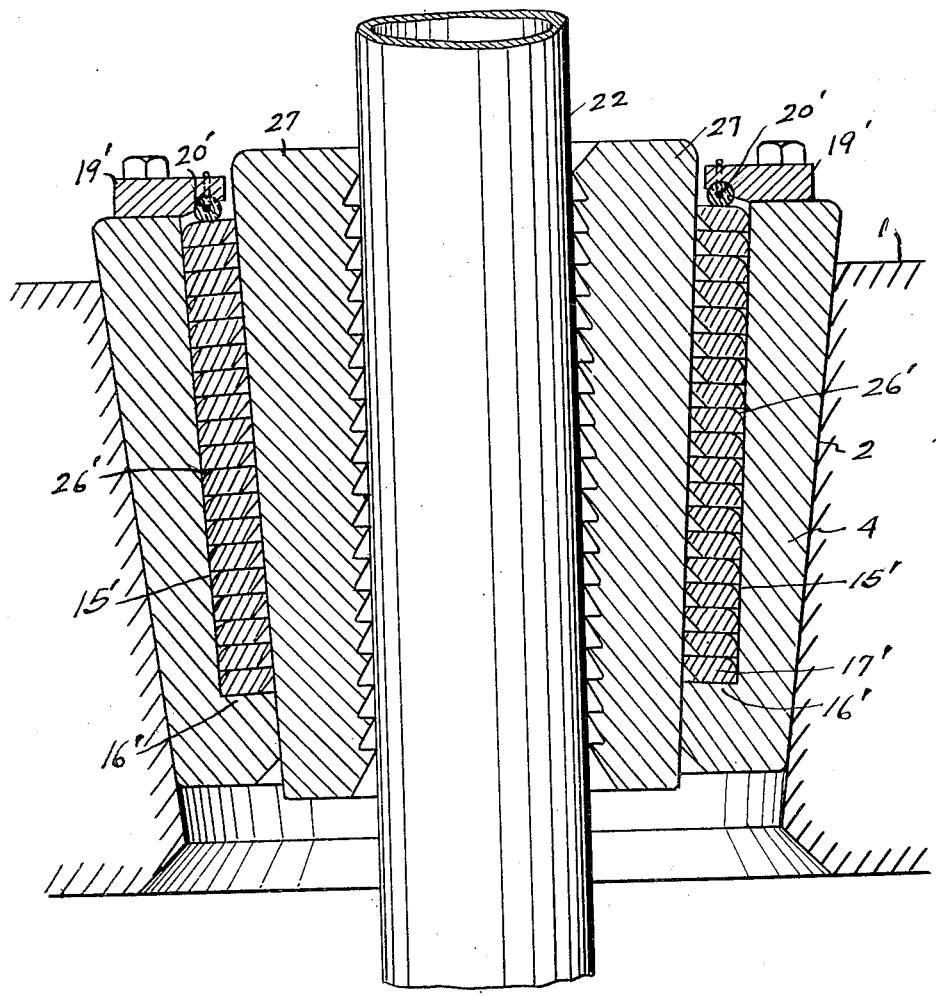
Figure 7 shows a vertical sectional view taken on the line 7—7 of Figure 5.

Referring now more particularly to the drawings, wherein like numerals of reference designate similar parts in each of the figures the numeral 1 designates a rotary table of a rotary drilling machine, or other support, having a downwardly converging seat 2 to receive the downwardly tapering adapter ring designated by the numeral 3 of the type shown in Figures 1–4, and by the numeral 4 of the type shown in Figures 5–7.

Referring to the type of holder shown in Figures 1–4 the adapter ring 3 is circular in cross sectional contour, and its external surface tapers downwardly so as to conform to and fit snugly within the seat 2. This adapter ring also has the internal downwardly converging seat 5. There is a slip formed of the confronting sections 6, 6 each section being formed of the segments 7, 7. If desired the slip may be formed of more sections and each section of more segments than shown. The outer side of each segment tapers downwardly so that when the sections are assembled into a complete slip it will fit within the seat 5. In the preferred form each segment has the marginal outwardly extending wings 8, 8 whose outer margins bear against the seat 5 when the slip is seated in said seat.

These wings extend above and beneath the segment proper, as shown. Two segments may be assembled together into a slip section by means of the transverse bolts 9, 9 and 10, 10 which may be fitted through the upper and lower ends, respectively, of the adjacent wings 8, 8. Each bolt has the usual head on one end and nut on the other end to retain the bolts in position and around these respective bolts are the upper and lower coil springs 11 and 12, which are located between the corresponding wings and whose ends are seated in recesses, as 13, in said wings. These springs 11, 12 give the slip the required flexibility.

The arms of the handles 14, 14 have bearings on the ends of the rods 9, of each slip section, and through these handles the slip sections may be handled independently.

The inner side of each segment has a wide vertical channel 15 formed therein which extends from the upper end of the segment down to the transverse ledge or shoulder 16 located near the lower end of such segment. The channel 15 is, preferably, rectangular in cross sectional contour. In this channel, of each segment, there is a series of platelike dogs 17 which are formed to fit loosely in the channel, and the dogs of the series being superimposed on one another, as shown.

Retaining plates 18 are secured onto the free ends of the sections whose inner margins project inwardly beyond the corresponding ends of said dogs and serve to retain them against displacement. Fitted between the upper ends of the wings 8, 8, of each segment, and secured to such segment, there is a retainer plate 19 whose inner edge is upwardly beveled and between said beveled edge and the upper dog 17 there is a resilient member 20 which holds said dogs yieldingly but firmly in position.

The ends of the dogs 17 are beveled inwardly and between said beveled portions the inner margins of the dogs are arcuate, as at 21, so that when the segments are assembled into a complete slip the inner margins of the dogs will conform to the contour of and engage about the pipe 22 to be held. The pipe engaging margins of said dogs may be milled, or otherwise roughened, or toothed, if desired, and their inner edges are preferably upwardly beveled.

In use the adapted ring 3 is seated in the downwardly converging seat 2, and the slip sections 6, 6 are then inserted into said ring around the pipe 22 to be held. A radially movable dog 23 is keyed in a radial socket 24, of each slip section and is seated against a coil spring 25. The outer end of each dog 23 is beveled, or tapered, and normally projects out beyond the corresponding segment. When a section of the slip is seated in the adapter ring seat, the corresponding dog 23 will engage against the upper end of the adapter ring and the spring 25 is strong enough to hold the dog projected so that said dog will sustain the weight of its slip section. These dogs will thus hold the slip sections in alignment, that is will prevent one section from dropping lower than the other section while the slip is being inserted around the pipe.

When the pipe is released by the pipe handling mechanism in the derrick and moves downwardly it will be frictionally engaged by said dogs 17 and the slip will be moved downwardly and inwardly in the seat 5, the dogs 23 now being forced inwardly, by the adapted ring out of engagement with the upper end of said adapter ring.

The dogs 17 will now engage and securely hold the pipe suspended in the bore without biting into or materially injuring the pipe.

Slips now commonly used for a similar purpose often wedge between the pipe and the seat, wherein the slips are located, so tightly that they will not release the pipe when the pipe is elevated in the process of making up or breaking up the string and it often happens that, in elevating the pipe, the rotary table or other support is lifted up with the pipe. When the present type of holder is employed upon elevating the pipe the dogs 17 will each swing upwardly about the outer curved bearing edges 26 thereof, which bear against the outer walls of the channels 15 and inner edges 21 of said dogs will thus swing upwardly and outwardly away from said pipe and the pipe will thus be readily released from the slip. The resilient members 20 will yield sufficiently to permit this upward and outward movement of said dogs 17 and yet will hold them normally in pipe engaging position.

Referring now to the form shown in Figures 5–7 the adapter ring 4 is preferably formed of two sections whose outer surfaces are downwardly tapered so as to conform to the shape of and to fit within the seat 2. In this type of holder any type of slips may be employed. The slips shown comprise the confronting downwardly tapering sections 27, 27 whose inner sides are toothed to engage the pipe 22, said sections having the grips, or handles 28, 28 by means of which they may be handled. In this form the adapter ring 4 has the inside vertical channels 15′ similar to the channels 15, and provided to receive the series of platelike dogs 17′, superimposed on one another each series being supported on the shoulder or ledge 16′ at the lower end of the corresponding channel 15′. The series of dogs 17′ are held in position by means of retainer plates 19′ which are secured to the upper end of the adapter ring 4 and interposed between each plate 19′ and the upper dog of the corresponding series there is a yieldable member, as 20′. The inner edge of each dog 17′ is arcuate so as to conform to the contour of the slip 27 and is upwardly beveled, and the outer edge of each dog 17′ is rounded off as at 26′ so as to permit the dogs to swing upwardly as the pipe 22 is elevated. The arcuate inner edges of said dogs 17′ are preferably smooth and the series of said inner edges converge downwardly and together form a downwardly converging seat to receive the slip sections 27 and when the weight of the pipe is on the slip this downwardly converging seat will force the slip sections 27 inwardly or into secure engaging relation with the pipe. When the pipe is elevated the slip will be carried upwardly with it and the inner edges of the dogs 17' will swing upwardly and outwardly thus releasing the slip and permitting its sections to readily release the pipe.

The adapter rings 3 and 4 have the oppositely disposed arms 29, 29 pivoted thereto, to work in vertical planes. The under side of the inner end of each arm 29 is formed with a cam face 30 and the outer end of each arm has a hand grip 31. Normally these arms 29 are beneath the upper end of the adapter ring and out of the way. In case the adapter ring becomes stuck in the seat 2 the outer ends of its arms may be pulled upwardly and the cam faces 30, operating against the upper end of the rotary table 1, or other pipe support, will be effective to unseat the adapter ring therefrom.

I have shown the preferred forms of the holder but it is apparent that mechanical changes may be made therein and equivalents substituted for the parts shown, and I reserve the right to make such changes and substitutions as may be found practical within the principle of the invention.

What I claim is:

1. A tubular member formed of sections having a series of superimposed engaging dogs loosely mounted therein and adapted to engage around an object in said member, and to hold the engaged object against downward movement through said member, said dogs being mounted for outward movement, relative to their respective sections so as to release the held object upon upward movement of the object relative to said member.

2. In a pipe holder, a tubular member vertically divided into sections and having vertical channels in its inner wall, a series of plate like pipe engaging dogs, arranged one above the other, in each channel, said dogs being mounted so that they will move about substantially horizontal axes.

3. In a pipe holder, a tubular member formed of sections having vertical channels in their inner walls, a series of pipe engaging dogs, arranged one above the other, in each channel, whose inner faces are disposed to engage and hold a pipe in said holder, means mounting the dogs to permit them to move upwardly and outwardly about substantially horizontal axes upon upward movement of the pipe.

4. In a pipe holder, a sectional tubular member having vertical channels in its inner wall, a series of flat pipe engaging dogs, arranged one above the other, in each channel, whose inner faces are disposed to engage and hold a pipe in said holder, said dogs being mounted so that said engaging faces will move upwardly and outwardly, about substantially horizontal axes, upon upward movement of the pipe relative thereto.

5. A tubular member formed of vertical sections and having series of superimposed engaging dogs therein adapted to engage around an object in said member, and to hold the engaged object against downward movement through said member, said dogs each being mounted to pivot about a substantially horizontal axis so as to release the held object upon upward movement of the object relative to said member, and yieldable means above the upper dog of each series and resisting said upward movement thereof.

6. In a pipe holder a tubular member divided into vertical sections and having vertical channels in its inner wall, a series of plate like pipe engaging dogs, loosely mounted one above the other, in each channel, the outer edge of each dog having a curved bearing face which is movable in contact with the opposing wall of the corresponding channel.

7. In a pipe holder, a slip formed of arcuate sections having tapering outer surfaces and assembled to seat in a downwardly converging seat, series of pipe engaging dogs, each dog of each series being mounted to pivot in the corresponding slip section and having inner edges which are vertically movable and are arranged to engage about a pipe in said holder.

8. In a pipe holder, a slip formed of arcuate sections having tapering outer surfaces and adapted to seat in a downwardly converging seat, series of pipe engaging dogs mounted in the slip sections and whose inner edges are arranged to engage about a pipe in said holder, said dogs being mounted to permit each engaging edge to move upwardly and outwardly, about a substantially horizontal axis, upon upward movement of the engaged pipe.

9. In a pipe holder a tubular member having a tapering external surface and adapted to seat in a downwardly converging seat of a support, an arm pivoted to said member to work on a horizontal axis, said arm having a cam face, at one end, adapted to work against said support upon the vertical movement of the other end of the arm.

10. In a pipe holder a tubular member formed to conform to the contour of and adapted to fit into a downwardly converging seat, series of superimposed engaging dogs mounted within said member and adapted to engage and hold an object therein, said dogs having inner engaging edges and being mounted so as to permit said edges to move upwardly and outwardly about independent, substantially horizontal, axes to release said object upon upward movement of the object.

11. In a pipe slip a segment having a longitudinal channel in its inner face, and a series of superimposed pipe engaging dogs in said channel and means mounting the dogs in the channel to permit them to swing about axes which lie in planes substantially at right angles to the axis of a pipe held by said slip.

12. In a pipe holder, a plate like pipe engaging dog having parallel flat faces and an arcuate engaging face at one margin and whose opposite margin is so curved as to preserve a straight line of contact with a flat surface while rocking against the same perpendicular to the planes of said flat faces.

13. In a pipe holder, a plate like pipe engaging dog having an arcuate engaging face at one margin and being substantially straight at the opposite margin, said dog having a curved bearing face from end to end of the dog terminating at said straight margin.

14. A holder for pipe, and the like, comprising a plurality of sections assembled in tubular relation, series of loosely mounted pipe engaging dogs lying one upon the other in superimposed relation and assembled with the holder sections, means retaining the dogs in assembled relation with their respective sections and permitting said dogs to move about substantially horizontal axes.

15. A holder for pipe, and the like, comprising holder sections assembled in tubular relation, series of loosely mounted, superimposed, plates forming dogs and assembled on the inner sides of said sections and lying one upon the other, said dogs having inner engaging faces and outer bearing faces, the inner faces of said dogs being disposed to grip and hold an object in the holder against downward movement, means retaining the series of dogs in assembled relation with the respective sections, said retaining means permitting the upward and outward movement of the inner faces of said dogs relative to the said outer faces thereof.

16. In a pipe holder a slip formed of arcuate sections having tapering outer surfaces and adapted to seat in a downwardly converging seat, a series of pipe engaging dogs mounted in each of the slip sections and whose inner edges are arranged to engage about a pipe in said holder and to grip and hold said pipe against downward movement, said dogs being mounted so as to permit said engaging edges to move upwardly and outwardly to release said pipe upon upward movement of the pipe.

17. In a pipe holder, a plate-like pipe engaging dog having flat parallel faces and having an arcuate pipe engaging face at one margin whose opposite margin has a cylindrical surface formed by the movement of a generatrix parallel to said flat faces.

18. In a pipe holder, a pipe engaging dog having flat, substantially parallel faces and one margin of which is shaped to engage a pipe, the margin of said dog opposite said pipe engaging margin being so curved as to preserve a straight line of contact with a flat surface while rocking against the same in a direction perpendicular to the planes of said flat faces.

19. In a pipe holder a pipe engaging dog having flat faces which are approximately parallel and one margin of which is shaped to conform to the contour of, and to engage, a pipe, the margin of said dog opposite the pipe engaging margin being shaped to preserve a straight line of contact with a flat surface while rocking against the same in a direction perpendicular to the planes of said flat faces.

20. In a pipe holder a pipe engaging dog having flat faces which are approximately parallel, one margin of said dog being arcuate to conform to the shape of a round object and the margin of said dog opposite said arcuate margin being so curved as to preserve a straight line of contact with a flat surface while rocking against the same in a direction perpendicular to the planes of said flat faces.

21. In a pipe holder, a pipe engaging dog having flat faces which are approximately parallel, one margin of said dog having an arcuate pipe engaging face and the opposite margin of said dog having a bearing face formed by the movement of a generatrix parallel to the flat faces.

In testimony whereof I have signed my name to this specification.

THOMAS W. ADAIR.